United States Patent
Park et al.

(10) Patent No.: US 11,659,194 B2
(45) Date of Patent: May 23, 2023

(54) METHOD OF ADJUSTING BITRATE OF IMAGE AND IMAGE CAPTURING APPARATUS

(71) Applicant: Hanwha Techwin Co., Ltd., Seongnam-si (KR)

(72) Inventors: Young Seo Park, Seongnam-si (KR); Sang Won Lee, Seongnam-si (KR); Yun Seok Kwon, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 11 days.

(21) Appl. No.: 16/034,888

(22) Filed: Jul. 13, 2018

(65) Prior Publication Data
US 2019/0020885 A1 Jan. 17, 2019

(30) Foreign Application Priority Data
Jul. 13, 2017 (KR) .................. 10-2017-0089158

(51) Int. Cl.
*H04N 19/42* (2014.01)
*H04N 19/176* (2014.01)
*H04N 19/146* (2014.01)
*H04N 19/48* (2014.01)
(Continued)

(52) U.S. Cl.
CPC ........... *H04N 19/42* (2014.11); *H04N 19/124* (2014.11); *H04N 19/146* (2014.11); *H04N 19/176* (2014.11); *H04N 19/18* (2014.11); *H04N 19/48* (2014.11)

(58) Field of Classification Search
CPC .. H04N 19/124; H04N 19/146; H04N 19/176; H04N 19/18; H04N 19/42; H04N 19/48
See application file for complete search history.

(56) References Cited

U.S. PATENT DOCUMENTS 5,959,672 A * 9/1999 Sasaki .................. H04N 19/503
375/240.14
6,026,190 A * 2/2000 Astle .................... H04N 19/176
375/E7.176
(Continued)

FOREIGN PATENT DOCUMENTS

KR 2004-0054750 A 6/2004
KR 100621584 B1 9/2006
(Continued)

OTHER PUBLICATIONS

KR Office action dated Feb. 1, 2021 for KR patent application No. KR2017-0089158.

*Primary Examiner* — Mohammed S Rahaman
(74) *Attorney, Agent, or Firm* — McLean IP Global; Jason Y. Pahng (57) ABSTRACT

A method of adjusting a bitrate of an image based includes: identifying magnitudes of one or more frequency components in the image; determining a frequency filter based on a difference between a current bitrate and a target bitrate of the image such that the greater is the difference between the current bitrate and the target bitrate, magnitudes of the more high frequency components are reduced by the frequency filter; and applying the determined frequency filter to the magnitudes of the one or more frequency components.

11 Claims, 8 Drawing Sheets

(51) Int. Cl.
*H04N 19/18* (2014.01)
*H04N 19/124* (2014.01)

(56) References Cited

U.S. PATENT DOCUMENTS

| | | | | |
|---|---|---|---|---|
| 6,895,055 | B2* | 5/2005 | Peng | H04N 19/34 |
| | | | | 375/240.03 |
| 7,869,500 | B2* | 1/2011 | Yankilevich | H04N 19/176 |
| | | | | 375/240.01 |
| 2003/0026336 | A1* | 2/2003 | Lee | H04N 19/139 |
| | | | | 375/240.03 |
| 2008/0159639 | A1* | 7/2008 | Dvir | H04N 19/176 |
| | | | | 382/236 |
| 2010/0091842 | A1* | 4/2010 | Ikeda | H04N 19/176 |
| | | | | 375/240.03 |
| 2015/0237346 | A1* | 8/2015 | Symes | H04N 19/124 |
| | | | | 375/240.03 |

FOREIGN PATENT DOCUMENTS

| | | |
|---|---|---|
| KR | 100797396 B1 | 1/2008 |
| KR | 100922376 B1 | 10/2009 |
| KR | 101286405 B1 | 7/2013 |
| WO | 2006006764 A1 | 1/2006 |

\* cited by examiner

| | FIRST DIRECTION FREQUENCY → | | | | |
|---|---|---|---|---|---|
| 663.2 (321) | −75.8 | 5.4 | −8.1 | −3.5 | ••• |
| 253.5 | −29.4 | −8.0 | −0.9 | −3.1 | ••• |
| 73.1 | 56.9 | −19.6 | 4.0 | −3.3 | ••• |
| −6.3 | 61.0 | 6.6 | −4.2 | 2.0 | ••• |
| −16.3 | 5.6 | 33.4 | −5.5 | 2.5 | ••• |
| ⋮ | ⋮ | ⋮ | ⋮ | ⋮ | |

SECOND DIRECTION FREQUENCY ↓

METHOD OF ADJUSTING BITRATE OF IMAGE AND IMAGE CAPTURING APPARATUS

CROSS-REFERENCE TO THE RELATED APPLICATION

This application claims priority from Korean Patent Application No. 10-2017-0089158, filed on Jul. 13, 2017, in the Korean Intellectual Property Office, the disclosure of which is incorporated herein in its entirety by reference.

BACKGROUND

1. Field

Methods and apparatuses consistent with the exemplary embodiments of the inventive concept relate to adjusting a bitrate of an image.

2. Description of the Related Art

Recently, a lot of surveillance cameras have been installed everywhere, and technology for recording, storing, and transferring images obtained through the surveillance cameras has been developed.

In particular, as the number of installed surveillance cameras increases, there is a need to efficiently use the surveillance cameras and network resources.

SUMMARY

The exemplary embodiment of the inventive concept provide a method of adjusting a bitrate of an image, capable of reducing a transmission bitrate of an image by reducing degradation in image quality, and an image capturing apparatus configured to perform this method.

The exemplary embodiments also provide a method of adjusting a bitrate of an image, allowing network resources to be efficiently used in a system including a plurality of image capturing apparatuses, and an image capturing apparatus configured to perform this method.

Various aspects of the inventive concept will be set forth in part in the description which follows and, in part, will be apparent from the description, or may be learned by practice of the presented embodiments.

According to one or more exemplary embodiments, there is provided a method of adjusting a bitrate of an image, which may include: identifying magnitudes of one or more frequency components in the image; determining a frequency filter to correspond to a difference between a current bitrate and a target bitrate of the image; and applying the determined frequency filter to the magnitudes of the one or more frequency components.

The determining the frequency filter may be performed such that the greater is the difference between the current bitrate and the target bitrate, magnitudes of the more high frequency components are reduced by the frequency filter.

The identifying the magnitudes of the one or more frequency components may include: performing a two-dimensional (2D) discrete cosine transformation (DCT) on the image; and arranging the magnitudes of the one or more frequency components on a 2D plane in a first direction and a second direction of the image.

The frequency filter may be configured to reduce magnitudes of frequency components other than magnitudes of frequency components existing between an origin point and a predetermined boundary line on the 2D plane, and the predetermined boundary line may be a straight line extending in a direction different from the first direction and the second direction, and the first direction and the second direction may be perpendicular to each other.

The frequency filter may include a first filter value corresponding to each of the frequency components existing between the origin point and the predetermined boundary line on the 2D plane, and a second filter value corresponding to each of the frequency components other than the frequency components existing between the origin point and the predetermined boundary line on the 2D plane. The first filter value may be 1 and the second filter value may be 0.

The applying the frequency filter to the magnitudes of the one or more frequency components may include: multiplying each of the magnitudes of the frequency components existing between the origin point and the predetermined boundary line on the 2D plane by the first filter value; and multiplying each of the magnitudes of the frequency components other than the frequency components existing between the origin point and the predetermined boundary line on the 2D plane by the second filter value.

The predetermined boundary line may be perpendicular to a line bisecting an angle formed by the first direction and the second direction.

The method may further include: after the applying the frequency filter, generating an output image based on the magnitudes of the one or more frequency components, to which the frequency filter is applied; and encoding the output image.

The image may include a plurality of image blocks, the identifying the magnitudes of the one or more frequency components comprises identifying magnitudes of one or more frequency components in each of at least one image block from among the plurality of image blocks, the determining the frequency filter may include determining a frequency filter corresponding to a difference between an output bitrate and a target bitrate of each image block, with respect to each of the at least one image block, and the applying the frequency filter may include applying the frequency filter determined with respect to each of the at least one image block, to the magnitudes of the one or more frequency components in each image block.

According to one or more embodiments, there is provided an image capturing apparatus which may include at least one processor to implement a controller and a memory, wherein the controller is configured to identify magnitudes of one or more frequency components in an image input to the image capturing apparatus, determine a frequency based on a difference between a current bitrate and a target bitrate of the image such that the greater is the difference between the current bitrate and the target bitrate, magnitudes of the more high frequency components are reduced by the frequency filter, and apply the determined frequency filter to the magnitudes of the one or more frequency components.

The controller may be configured to perform a two-dimensional (2D) discrete cosine transformation (DCT) on the image, and arrange the magnitudes of the one or more frequency components on a 2D plane in a first direction and a second direction of the image.

The frequency filter may be configured to reduce magnitudes of frequency components other than magnitudes of frequency components existing between an origin point and a predetermined boundary line on the 2D plane, the predetermined boundary line may be a straight line extending in a direction different from the first direction and the second direction, and the first direction and the second direction may be perpendicular to each other.

The frequency filter may have a first filter value corresponding to each of the frequency components existing between the origin point and the predetermined boundary line on the 2D plane, and a second filter value corresponding to each of the frequency components other than the frequency components existing between the origin point and the predetermined boundary line on the 2D plane. The first filter value may be 1 and the second filter value may be 0.

The controller may be configured to multiply each of the magnitudes of the frequency components existing between the origin point and the predetermined boundary line on the 2D plane by the first filter value, and multiply each of the magnitudes of frequency components other than the frequency components between the origin point and the predetermined boundary line on the 2D plane by the second filter value.

The predetermined boundary line may be perpendicular to a line bisecting an angle formed by the first direction and the second direction.

The controller may be configured to generate an output image based on the magnitudes of the one or more frequency components, to which the frequency filter is applied, and encode the output image.

The image may include a plurality of image blocks, the controller may be configured to identify magnitudes of one or more frequency components in each of at least one image block from among the plurality of image blocks, to determine a frequency filter corresponding to a difference between an output bitrate and a target bitrate of each image block, with respect to each of the at least one image block, and to apply the frequency filter determined with respect to each of the at least one image block, to the magnitudes of the one or more frequency components in each image block.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments which are explained in reference to the accompanying drawings, wherein like reference numerals refer to like elements throughout. In this regard, the presented embodiments may have different forms and should not be construed as being limited to the descriptions set forth herein. Accordingly, these embodiments are merely described below, by referring to the drawings, to explain various aspects of the inventive concept. As used herein, the term "and/or" includes any and all combinations of one or more of the associated listed items.

As the inventive concept allows for various changes and numerous embodiments, particular exemplary embodiments will be illustrated in the drawings and described in detail in the written description. The attached drawings for illustrating these embodiments are referred to in order to gain a sufficient understanding, the merits thereof, and the objectives accomplished by the implementation. However, the embodiments may have different forms and should not be construed as being limited to the descriptions set forth herein.

The exemplary embodiments will be described below in more detail with reference to the accompanying drawings. Those components that are the same or are in correspondence are rendered the same reference numeral regardless of the figure number, and redundant explanations are omitted.

While such terms as "first," "second," etc., may be used to describe various components, such components must not be limited to the above terms. The above terms are used only to distinguish one component from another. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Sizes of components in the drawings may be exaggerated for convenience of explanation. In other words, since sizes and shapes of components in the drawings are arbitrarily illustrated for convenience of explanation, the following embodiments are not limited thereto.

Figure 1:
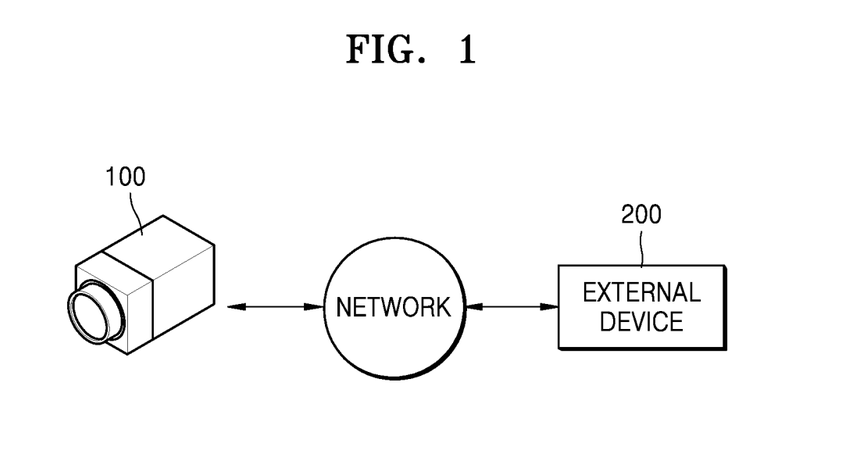
FIG. 1 is a diagram schematically showing an image system according to an embodiment.

FIG. 1 is a diagram schematically showing an image system according to an embodiment.

Referring to FIG. 1, the image system according to an embodiment may include an image capturing apparatus 100 and an external device 200.

The external device 200 according to the embodiment may include various devices receiving, from the image capturing apparatus 100, images captured by the image capturing apparatus 100. For example, the external device 200 may be one of a video management system (VMS), a central management system (CMS), a network video recorder (NVR), and a digital video recorder (DVR). Otherwise, the external device 200 may be a personal computer (PC) or a portable terminal. However, the present disclosure is not limited to the above examples, and any type of device that may receive images captured by the image capturing apparatus 100 via the network and may display and/or store the images may be used as the external device 200 according to the inventive concept.

In addition, the network connects the image capturing apparatus 100 to the external device 200. For example, the network may provide a path through which the images captured by the image capturing apparatus 100 are transferred to the external device 200. The network may include, but is not limited to, a wired network such as local area network (LAN), wide area network (WAN), metropolitan area network (MAN), integrated service digital network (ISDN), etc., or a wireless network such as wireless LAN, code division multiple access (CDMA), Bluetooth, satellite communication, etc.

The image capturing apparatus 100 according to the embodiment may capture the image and transmit the image to the external device 200. Here, the image capturing apparatus 100 may adjust a bitrate of the image by adjusting a magnitude of a high frequency component in the image.

Figure 2:
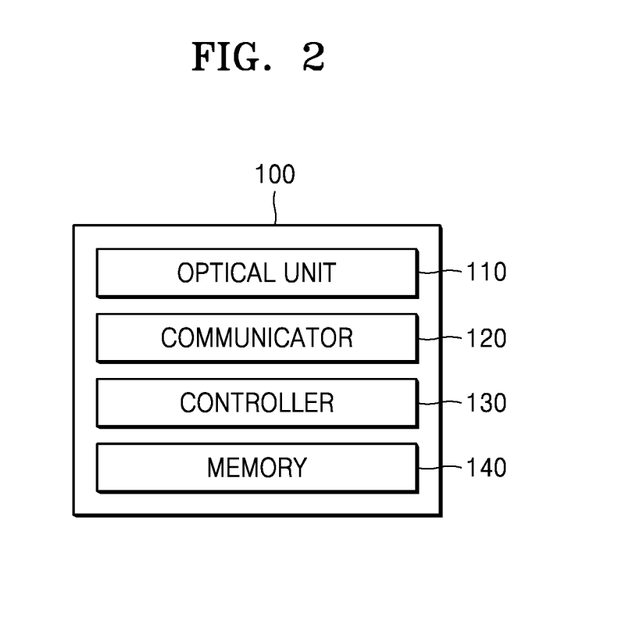
FIG. 2 is a schematic block diagram of an image capturing apparatus according to an embodiment.

FIG. 2 is a schematic block diagram of the image capturing apparatus 100 according to an embodiment.

Referring to FIG. 2, the image capturing apparatus 100 according to the embodiment may include an optical unit 110, a communicator 120, a controller 130, and a memory 140.

The optical unit 110 may include a lens and an image sensor for converting light into an electrical signal. The lens may be a lens group including one or more lenses. The image sensor may transform the image input through the lens into the electrical signal. For example, the image sensor may be a semiconductor device, e.g., a charge coupled device (CCD) or a complementary metal oxide semiconductor (CMOS), capable of transforming an optical signal into an electrical signal (referred to as an image in the present disclosure).

The communicator 120 may be a device including hardware and/or software that are necessary for transmitting/receiving signals such as a control signal or a data signal to/from another network device via wired/wireless connection, but the present disclosure is not limited thereto.

The controller 130 may adjust the magnitude of the high frequency component in the image so that the bitrate of the image may correspond to a target bitrate. Here, the controller 130 may include all kinds of devices capable of processing data, e.g., a processor. Here, 'processor' may denote, for example, a data processing device built in hardware, and includes a physically structured circuit for executing functions expressed as code or commands included in a program. Examples of the data processing device built into the hardware may include a microprocessor, a central processing unit (CPU), a processor core, a multiprocessor, an application-specific integrated circuit (ASIC), a field programmable gate array (FPGA), etc., but the scope of the present disclosure is not limited thereto.

In addition, the controller 130 may include a single processor, or a plurality of processors that are classified in units of functions performed by the controller 130. For example, the controller 130 may include one processor and/or one operator, and thus, identifies one or more frequency components in the image, determines or selects a frequency filter to be applied to the image, and encodes the image. Alternatively, the controller 130 may include a frequency identifier for identifying one or more frequency components in the image, a frequency filter determiner for determining or selecting a frequency filter, and an encoder for encoding the image. The frequency identifier and the frequency filter may be implemented by one or more hardware components and/or software components in the controller 130, and/or stored in the memory 140 for use by the controller 130. However, the inventive concept is not limited to the above examples.

The memory 140 temporarily or permanently stores data, instructions, programs, program code processed by the controller 130, or a combination thereof. The memory 140 may include a magnetic storage medium or a flash storage medium, but the inventive concept is not limited thereto. The memory 140 may temporarily or permanently store images captured by the image capturing apparatus 100, in addition to the data and instructions processed by the controller 130.

The controller 130 according to the embodiment may adjust the bitrate of the image, by adjusting the magnitude of the high frequency component of the image.

In the present disclosure, the 'image' may denote images of various sizes including at least one pixel. For example, the image may denote one of a plurality of frames configuring a video. Also, the image may denote one of a plurality of image blocks configuring one frame. As described above, the image may include at least one pixel regardless of a size thereof.

Hereinafter, for convenience of description, each operation of the controller 130 is performed in units of image blocks of a predetermined size. However, the inventive concept is not limited to the above examples.

The controller 130 according to the embodiment may identify magnitudes of one or more frequency components in the image.

In the present disclosure, the 'magnitudes of the frequency components' in the image may denote the magnitudes of one or more frequency components configuring the corresponding image. The controller 130 may perform a two-dimensional (2D) discrete cosine transformation (DCT) on the image to identify the magnitudes of the one or more frequency components. In other words, the controller 130 may identify the magnitudes of one or more frequency components configuring the corresponding image on a 2D space.

The controller 130, otherwise, may perform a one-dimensional DCT on the image, and then may identify magnitudes of one or more frequency components included in a line, with respect to each line.

However, the above-described DCT operation is an example method for identifying the magnitude of the frequency component in the image, and the inventive concept is not limited thereto. Therefore, the controller 130 may use other transformation methods than the DCT, e.g., Fourier Transformation, or may use various well-known methods of identifying the frequency components of the image.

Figure 3A:
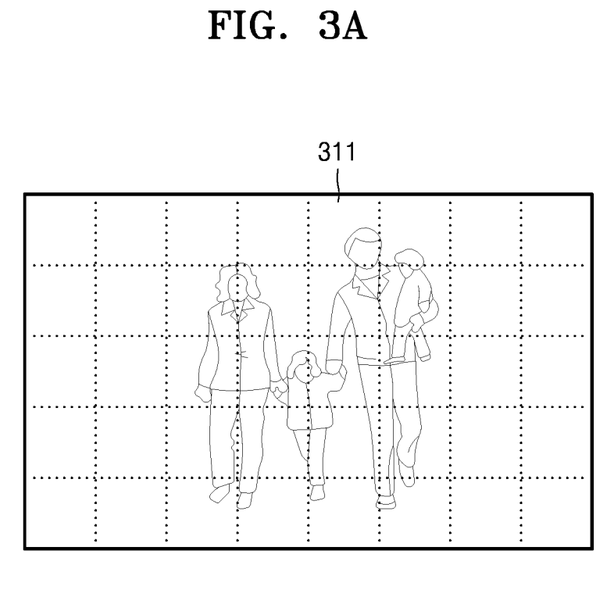
FIGS. 3A and 3B are diagrams showing an example, in which a controller according to an embodiment identifies a magnitude of one or more frequency components in an image.
Figure 3B:
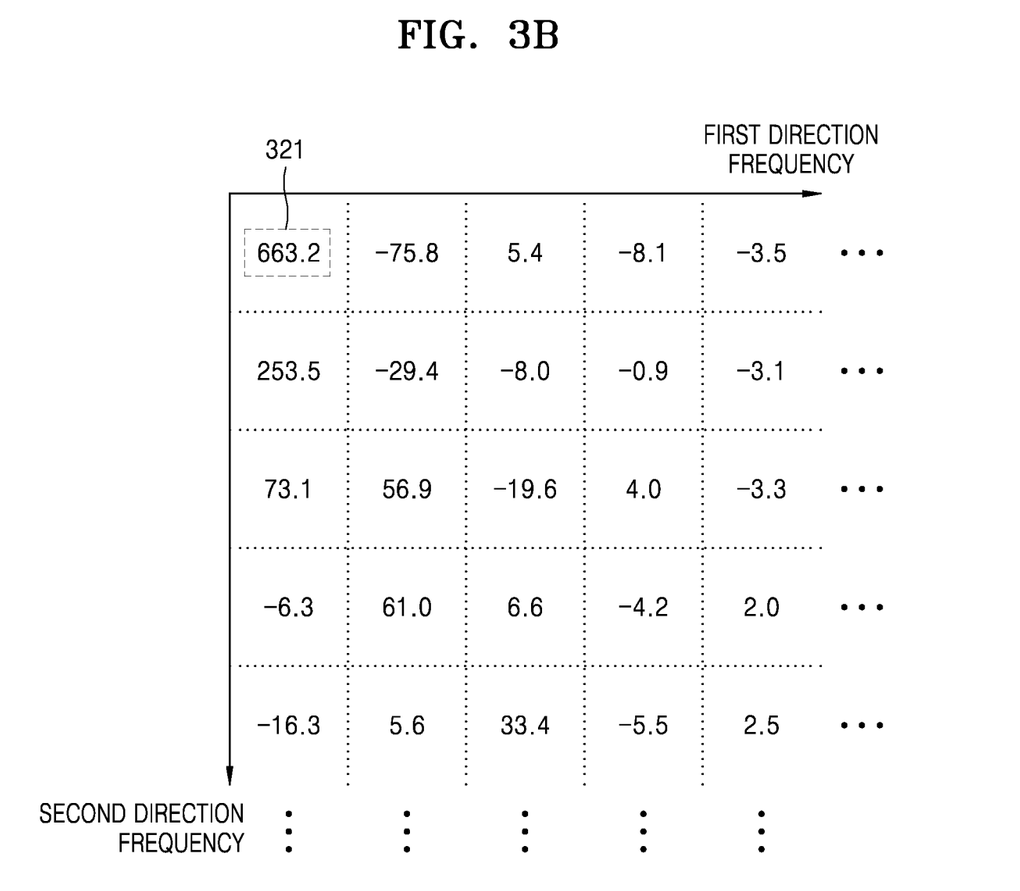

FIGS. 3A and 3B are diagrams showing an example, in which the controller 130 according to an embodiment identifies magnitudes of one or more frequency components in an image.

For convenience of description, it is assumed that the image shown in FIG. 3A is processed in units of image blocks that are obtained by splitting the image in a predetermined size. Also, it is assumed that magnitudes of one or more frequency components configuring an image block 311 are as shown in FIG. 3B.

Referring to FIG. 3B, the controller 130 may identify the magnitudes of one or more frequency components configuring the image, that is, the image block 311, on a 2D space defined in a first direction and a second direction. Also, the controller 130 may arrange the identified magnitudes of the one or more frequency components on a 2D plane, as shown in FIG. 3B.

Here, a magnitude 321 at an upper left end of the arrangement may denote a magnitude of a component having the frequency of 0 (that is, the magnitude of a DC component), from among one or more frequency components configuring the image block 311. Also, the first direction and the second direction may be perpendicular to each other. For example, the first direction may be an X direction on an X-Y plane and the second direction may be a Y direction.

The controller 130 according to the embodiment may determine a frequency filter to correspond to a difference between a current bitrate of the image and the target bitrate. Here, the current bitrate of the image may denote bitrate of the image, to which the frequency filter is not applied. Also, the target bitrate may denote a bitrate that an output image from the image capturing apparatus 100 has to satisfy, according to requirements of the system (see FIG. 1) and/or the network (see FIG. 1) according to the embodiment, and may have a value that is generally less than the current bitrate. The frequency filter will be described later.

In addition, that the controller 130 determines the frequency filter to correspond to the difference between the current bitrate and the target bitrate may denote that, the greater is the difference between the current bitrate and the target bitrate, a filter capable of reducing magnitudes of the more high frequency components may be determined as the frequency filter. In other words, as the difference between the bitrates increases, the controller 130 may select a filter capable of excluding more high frequency components from the image as the frequency filter.

It is assumed that the magnitudes of one or more frequency components that are identified through the above-described methods are arranged on the 2D plane as shown in FIG. 3B. Assuming the above, the frequency filter according to the embodiment may reduce magnitudes of frequency components other than frequency components existing between the origin point and the predetermined boundary line on the 2D plane. In other words, the frequency filter may be a filter that maintains only the frequency components located between the origin point and the predetermined boundary line on the 2D plane.

To do this, the frequency filter according to the embodiment may have a first filter value corresponding to each of the frequency components located between the origin point and the predetermined boundary line on the 2D plane. Also, the frequency filter according to the embodiment may have a second filter value as a value corresponding to each of the frequency components other than the frequency components existing between the origin point and the predetermined boundary line on the 2D plane. Here, the first filter value may be, for example, 1, and the second filter value may be, for example, 0. However, inventive concept is not limited to the above examples.

In addition, the predetermined boundary line may be a straight line extending in a different direction from the first direction and the second direction that define the plane. For example, the predetermined boundary line may be a straight line extending in a direction perpendicular to a line that bisects an angle formed by the first direction and the second direction.

Also, the origin point on the 2D plane may denote an intersection point of a frequency axis in the first direction and a frequency axis in the second direction at the upper left end of FIG. 3B.

Figure 4A:
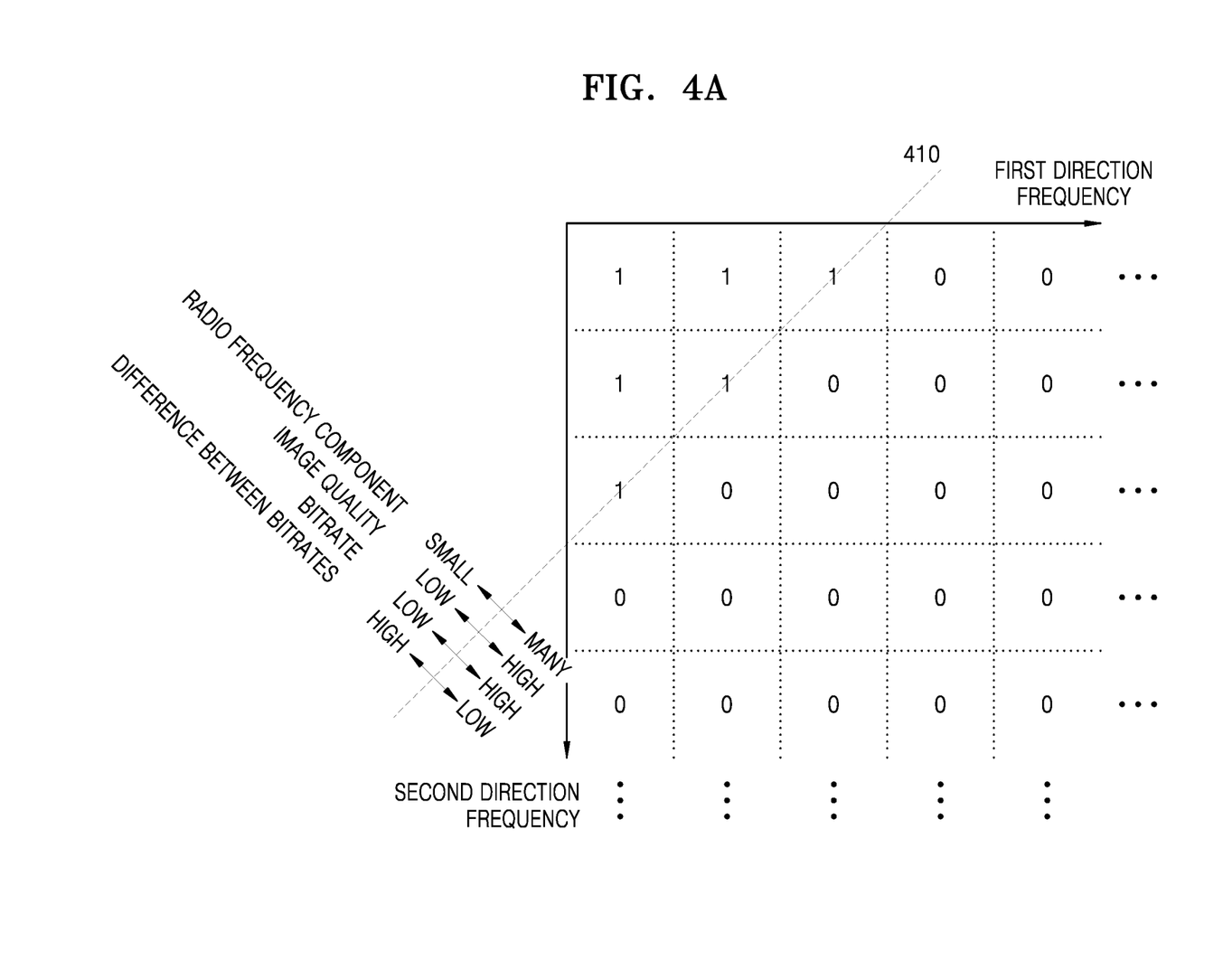
FIG. 4A is a diagram illustrating a variation in characteristics of a frequency filter according to a location of a boundary line in the frequency filter.
Figure 4B:
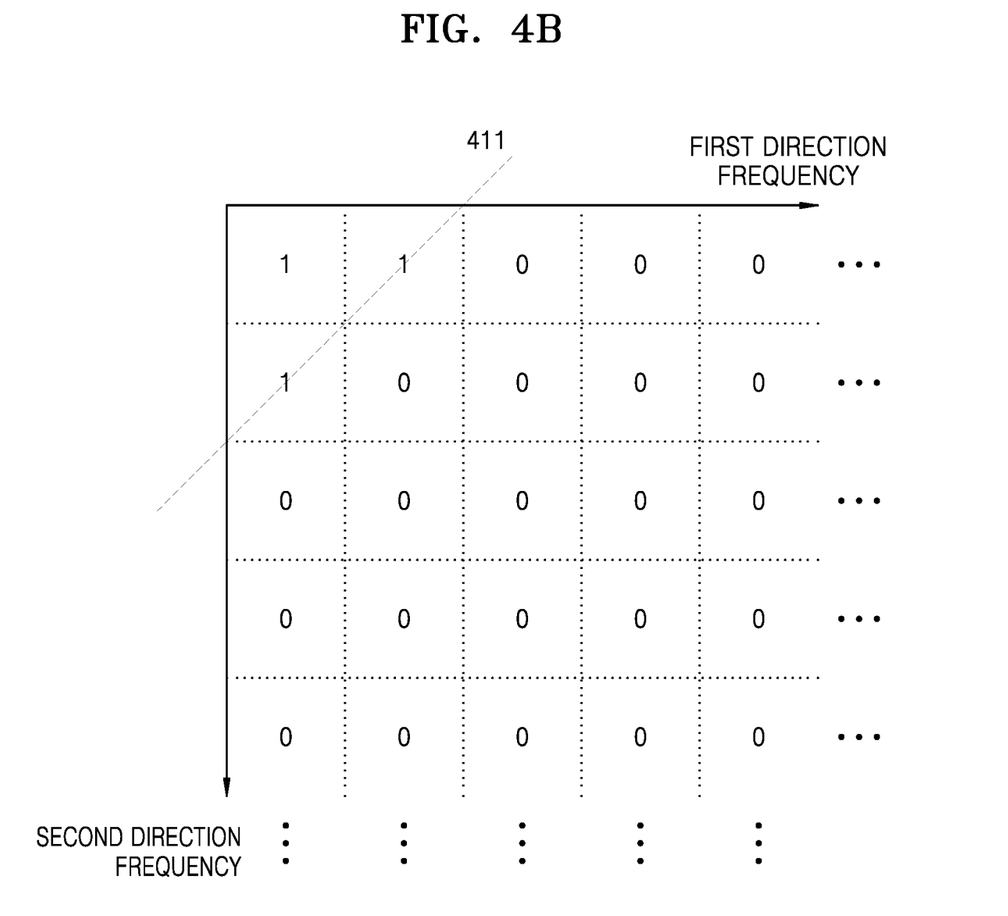
FIG. 4B shows an example of a frequency filter corresponding to a case in which a difference between a current bitrate and a target bitrate is relatively large.
Figure 4C:
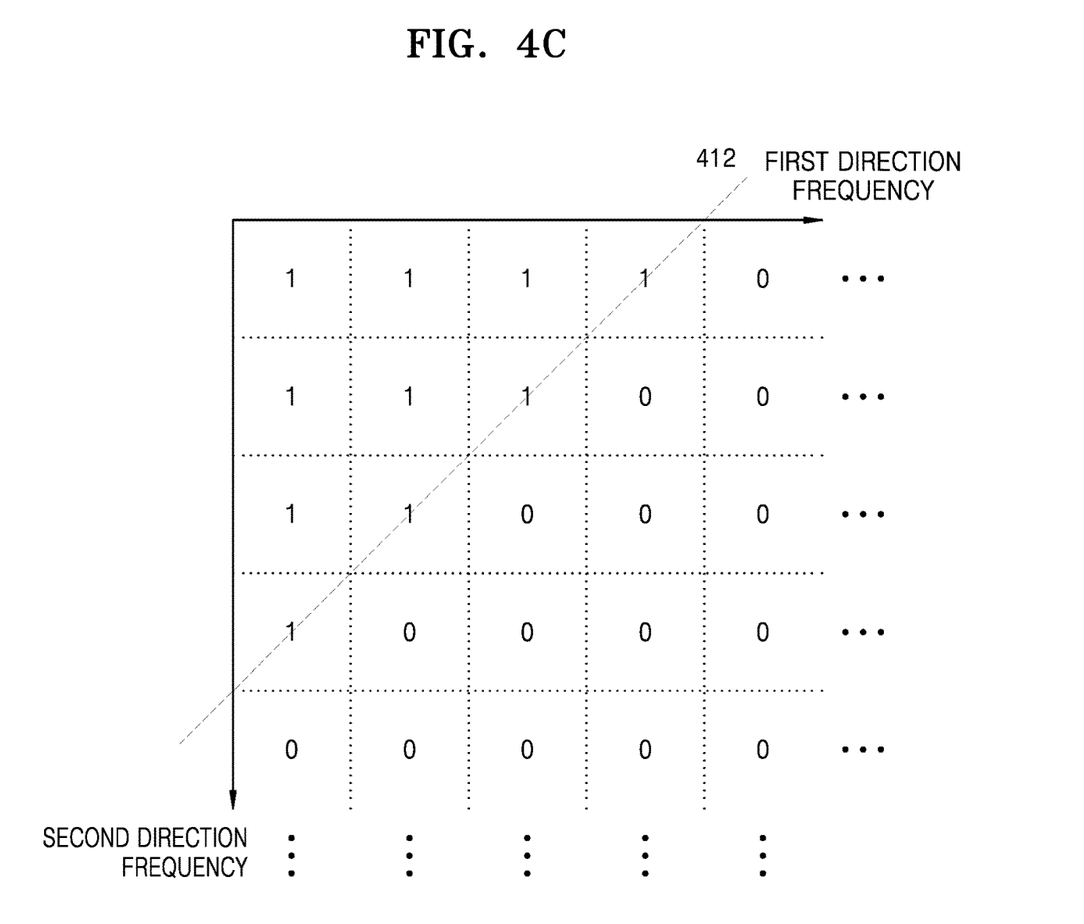
FIG. 4C shows an example of a frequency filter corresponding to a case where a difference between a current bitrate and a target bitrate is relatively small.

FIGS. 4A to 4C are diagrams showing examples of a frequency filter according to an embodiment.

FIGS. 4A and 4B illustrate a variation in characteristics of the frequency filter according to a location of a boundary line 410. For example, as shown in FIG. 4B, when the boundary line 410 is close to the origin point, a relatively small number of the high frequency components are included in the output image, the quality of the output image degrades, and the bitrate of the output image also decreases. Thus, when a difference between the current bitrate and the target bitrate is relatively large, a frequency filter having the boundary line 410 close to the origin point as in FIG. 4B may be used to overcome the difference.

Referring to FIG. 4B, a boundary line 411 is close to the origin point. When the above frequency filter is applied to the magnitudes of one or more frequency components, the output image only includes three frequency components, which will be described later.

Referring back to FIG. 4A, when the boundary line 410 is far from the origin point, a relatively large number of the high frequency components are included in the output image, the quality of the output image is improved, and the bitrate of the output image also increases. Thus, when a difference between the current bitrate and the target bitrate is relatively small, a frequency filter having the boundary line 410 far from the origin point as in FIG. 4A may be used.

FIG. 4C shows an example of a frequency filter corresponding to a case where the difference between the current bitrate and the target bitrate is relatively small.

Referring to FIG. 4C, a boundary line 412 is far from the origin point when comparing with the case of FIG. 4B. When the above frequency filter is applied to the magnitudes of one or more frequency components, the output image includes ten frequency components, which will be described later.

The above frequency filters may be generated in advance according to the difference between the current bitrate and the target bitrate, and may be stored in the memory 140. In other words, the memory 140 stores one or more frequency filters, and the controller 130 may select an appropriate frequency filter from the one or more frequency filters stored in the memory 140, according to the difference between the current bitrate and the target bitrate, and may apply the selected filter to the magnitude of the frequency component.

The controller 130 according to the embodiment may apply the frequency filter determined or selected through the above methods to the magnitudes of one or more frequency components.

Here, 'applying' of the frequency filter to the magnitudes of the one or more frequency components by the controller 130 may denote multiplying the magnitudes of the frequency components respectively by the corresponding filter values. In other words, the controller 130 according to the embodiment may multiply a magnitude of each of the frequency components located between the origin point and the predetermined boundary line on the 2D plane by the first filter value, and may multiply a magnitude of each of the frequency components other than the above frequency components between the origin point and the predetermined boundary line, by the second filter value.

For example, as described above, when the first filter value is 1 and the second filter value is 0, the controller 130 according to the embodiment may multiply a magnitude of each of the frequency components between the origin point and the predetermined boundary line on the 2D plane by 1, and may multiply a magnitude of each of the remaining frequency components by 0. As such, the frequency components located between the origin point and the predetermined boundary line on the plane may be maintained, and the other frequency components may disappear.

Figure 5:
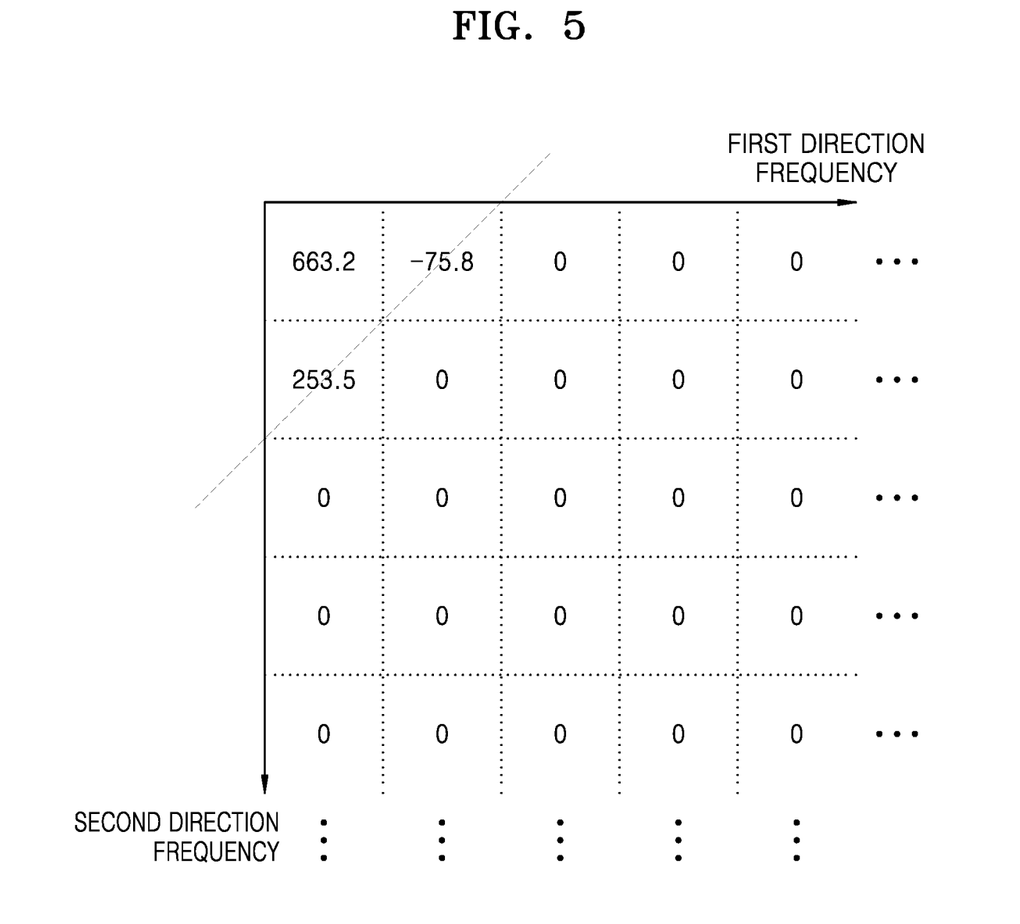
FIG. 5 is a diagram of an example in which magnitudes of one or more frequency components as shown in FIG. 3B are applied by the frequency filter as shown in FIG. 4B.

FIG. 5 shows an example in which the magnitudes of the one or more frequency components as shown in FIG. 3B are applied by the frequency filter as shown in FIG. 4B.

According to the frequency filter shown in FIG. 4B, the origin point and two points adjacent to the origin point have a value of 1 (that is, the filter value from the origin point to the boundary line is 1), and the other points have a value of 0 (that is, the filter value beyond the boundary line is 0). Also, as described above, applying of the filter may denote that the locations corresponding to the frequency components are multiplied by the filter value of the corresponding locations, and thus, the magnitudes of the frequency components only at the origin point and two points adjacent to the origin point may remain as application results of the frequency filter.

In addition, the above values '1' and '0' are examples, and the frequency filter may have different values according to design. For example, a value '1.0001' may be used instead of the value '1', and a value '0.0001' may be used instead of the value '0'. However, the inventive concept is not limited to the above examples.

In addition, the controller 130 according to the embodiment may generate an output image based on the one or more frequency components, to which the frequency filter is applied. For example, the controller 130 may perform an inverse discrete cosine transformation (IDCT) on the one or more frequency components, to which the frequency filter is applied, to transform the one or more frequency components into the output image. Here, the output image may be an image block unit image or a frame unit image.

Assuming that the controller 130 processes the image in units of image blocks configuring the image (or frame), the controller 130 may identify the magnitudes of the one or more frequency components in each of at least one image block, from among a plurality of image blocks configuring the image. The controller 130 may determine the frequency filter corresponding to a difference between an output bitrate and a target bitrate of each image block, with respect to each of the one or more image blocks. The controller 130 may apply the frequency filter that is determined with respect to each of the one or more image blocks, to the magnitudes of one or more frequency components in each image block. Finally, the controller 130 may generate the output image based on the one or more frequency components, to which the frequency filter is applied, in each image block.

The controller 130 according to the embodiment may encode the output image that is generated through the above-described processes.

As such, according to the inventive concept, the output image of improved image quality may be generated while satisfying the target bitrate.

Figure 6:
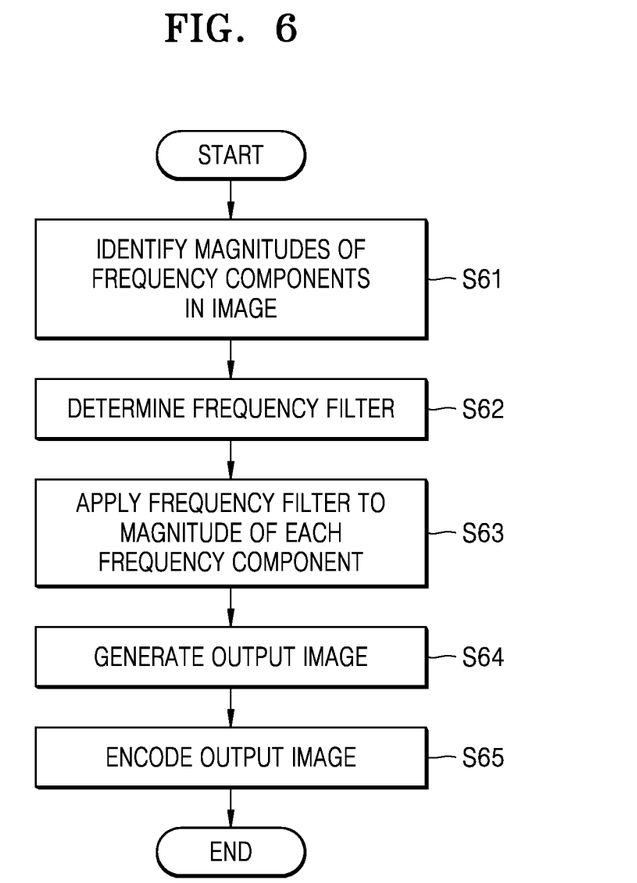
FIG. 6 is a flowchart illustrating a method of adjusting bitrate, performed by an image capturing apparatus, according to an embodiment.

FIG. 6 is a flowchart illustrating a method of adjusting bitrate, performed by the image capturing apparatus 100, according to an embodiment.

The image capturing apparatus 100 according to the embodiment may identify magnitudes of one or more frequency components in an image (S61).

In the present disclosure, 'magnitudes of the frequency components' in the image may denote magnitudes of one or more frequency components configuring the corresponding image. The image capturing apparatus 100 may perform a 2D DCT on the image to identify the magnitudes of the one or more frequency components. In other words, the image capturing apparatus 100 may identify magnitudes of one or more frequency components configuring the corresponding image on a 2D space.

The image capturing apparatus 100, otherwise, may perform a one-dimensional DCT on the image, and then may identify magnitudes of one or more frequency components included in a line, with respect to each line.

However, the above-described DCT operation is an example method for identifying the magnitude of the frequency component in the image, and the inventive concept is not limited thereto. Therefore, the image capturing apparatus 100 may use other transformation methods than the DCT, e.g., Fourier Transformation, or may use various well-known methods of identifying the frequency components of the image.

Referring back to FIGS. 3A to 3B, a method of identifying the magnitudes of one or more frequency components in the image, by the image capturing apparatus 100 according to the embodiment, will be described below.

For convenience of description, it is assumed that the image shown in FIG. 3A is processed in units of image blocks that are obtained by splitting the image in a predetermined size. Also, it is assumed that magnitudes of one or more frequency components configuring an image block 311 are as shown in FIG. 3B.

Referring to FIG. 3B, the image capturing apparatus 100 may identify the magnitudes of one or more frequency components configuring the image, that is, the image block 311, on a 2D space defined in a first direction and a second direction. Also, the image capturing apparatus 100 may arrange the identified magnitudes of the one or more frequency components on a 2D plane, as shown in FIG. 3B.

Here, a magnitude 321 at an upper left end of the arrangement may denote a magnitude of a component having the frequency of 0 (that is, the magnitude of a DC component), from among one or more frequency components configuring the image block 311. Also, the first direction and the second direction may be perpendicular to each other. For example, the first direction may be an X direction on an X-Y plane and the second direction may be a Y direction.

The image capturing apparatus 100 according to the embodiment may determine a frequency filter to correspond to a difference between a current bitrate of the image and the target bitrate (S62). Here, the current bitrate of the image may denote bitrate of the image, to which the frequency filter is not applied. Also, the target bitrate may denote a bitrate that an output image from the image capturing apparatus 100 has to satisfy, according to requirements of the system (see FIG. 1) and/or the network (see FIG. 1) according to the embodiment, and may have a value that is generally less than the current bitrate.

In addition, that the image capturing apparatus 100 determines the frequency filter to correspond to the difference between the current bitrate and the target bitrate may denote that the greater is the difference between the current bitrate and the target bitrate increases, a filter capable of reducing magnitudes of the more high frequency components may be determined as the frequency filter. In other words, as the difference between the bitrates increases, the image capturing apparatus 100 may select a filter capable of excluding more high frequency components from the image as the frequency filter.

It is assumed that the magnitudes of one or more frequency components that are identified through the above-described methods are arranged on the 2D plane as shown in FIG. 3B. Assuming the above, the frequency filter according to the embodiment may reduce magnitudes of frequency components other than frequency components existing between the origin point and the predetermined boundary line. In other words, the frequency filter may be a filter that maintains only the frequency components located between the origin point and the predetermined boundary line on the 2D plane.

To do this, the frequency filter according to the embodiment may have a first filter value corresponding to each of the frequency components located between the origin point and the predetermined boundary line on the 2D plane. Also, the frequency filter according to the embodiment may have a second filter value as a value corresponding to each of the remaining frequency components other than the frequency components existing between the origin point and the predetermined boundary line on the 2D plane. Here, the first filter value may be, for example, 1, and the second filter value may be, for example, 0. However, the inventive concept is not limited to the above examples.

In addition, the predetermined boundary line may be a straight line extending in a different direction from the first direction and the second direction that define the plane. For example, the predetermined boundary line may be a straight line extending in a direction perpendicular to a line that bisects an angle formed by the first direction and the second direction.

Also, the origin point on the 2D plane may denote an intersection point of a frequency axis in the first direction and a frequency axis in the second direction at the upper left end of FIG. 3B.

Referring back to FIGS. 4A and 4B, a variation in characteristics of the frequency filter according to a location of the boundary line 410 in the frequency filter will be described below. For example, as shown in FIG. 4B, when the boundary line 410 is close to the origin point, a relatively small number of the high frequency components are included in the output image, the quality of the output image degrades, and the bitrate of the output image also decreases. Thus, when a difference between the current bitrate and the target bitrate is relatively large, a frequency filter having the boundary line 410 close to the origin point as in FIG. 4B may be used to overcome the difference.

Referring to FIG. 4B, a boundary line 411 is close to the origin point. The above frequency filter is applied to the magnitude of one or more frequency components, the output image only includes three frequency components, which will be described later.

In addition, when the boundary line 410 is far from the origin point, a relatively large number of the high frequency components are included in the output image, the quality of the output image is improved, and the bitrate of the output image also increases. Thus, when a difference between the current bitrate and the target bitrate is relatively small, a frequency filter having the boundary line 410 far from the origin point as in FIG. 4A may be used.

Referring to FIG. 4C, a boundary line 412 is far from the origin point when compared with the case of FIG. 4B. The above frequency filter is applied to the magnitude of one or more frequency components, the output image includes ten frequency components.

In addition, the above frequency filters may be generated in advance according to the difference between the current bitrate and the target bitrate, and may be stored in the memory 140. In other words, the memory 140 stores one or more frequency filters, and the image capturing apparatus 100 may select an appropriate frequency filter from the one or more frequency filters stored in the memory 140, according to the difference between the current bitrate and the target bitrate, and may apply the selected filter to the magnitude of the frequency component.

The image capturing apparatus 100 according to the embodiment may apply the frequency filter determined or selected through the above methods to the magnitudes of one or more frequency components (S63). Here, 'applying' of the frequency filter to the magnitudes of the one or more frequency components by the image capturing apparatus 100 may denote multiplying the magnitudes of the frequency components respectively by the corresponding filter values.

In other words, the image capturing apparatus 100 according to the embodiment may multiply a magnitude of each of the frequency components located between the origin point and the predetermined boundary line on the 2D plane by the first filter value, and may multiply a magnitude of each of the frequency components other than the above frequency components between the origin point and the predetermined boundary line, by the second filter value.

For example, as described above, when the first filter value is 1 and the second filter value is 0, the image capturing apparatus 100 according to the embodiment may multiply a magnitude of each of the frequency components between the origin point and the predetermined boundary line on the 2D plane by 1, and may multiply a magnitude of each of the other frequency components by 0. As such, the frequency components located between the origin point and the predetermined boundary line on the plane may be maintained, and the other frequency components may disappear.

Referring back to FIG. 5, the magnitudes of the one or more frequency components as shown in FIG. 3B are applied by the frequency filter as shown in FIG. 4B. According to the frequency filter shown in FIG. 4B, the origin point and two points adjacent to the origin point have a value of 1 (that is, the filter value from the origin point to the boundary line is 1), and the other points have a value of 0 (that is, the filter value beyond the boundary line is 0). Also, as described above, applying of the filter may denote that the locations corresponding to the frequency components are multiplied by the filter value of the corresponding locations, and thus, the magnitudes of the frequency components only at the origin point and two points adjacent to the origin point may only remain as application results of the frequency filter.

In addition, the above values '1' and '0' are examples, and the frequency filter may have different values according to design. For example, a value '1.0001' may be used instead of the value '1', and a value '0.0001' may be used instead of the value '0'. However, the inventive concept is not limited to the above examples.

The image capturing apparatus 100 according to the embodiment may generate an output image based on the one or more frequency components, to which the frequency filter is applied (S64). For example, the image capturing apparatus 100 may perform an IDCT on the one or more frequency components, to which the frequency filter is applied, to transform the one or more frequency components into the output image. Here, the output image may be an image block unit image or a frame unit image.

Assuming that the image capturing apparatus 100 processes the image in units of image blocks configuring the image (or frame), the image capturing apparatus 100 may identify the magnitudes of the one or more frequency components in each of at least one or more image blocks, from among a plurality of image blocks configuring the image. The image capturing apparatus 100 may determine the frequency filter corresponding to a difference between an output bitrate and a target bitrate of each image block, with respect to each of the one or more image blocks. The image capturing apparatus 100 may apply the frequency filter that is determined with respect to each of the one or more image blocks, to the magnitudes of one or more frequency components in each image block. Finally, the image capturing apparatus 100 may generate the output image based on the one or more frequency components, to which the frequency filter is applied, in each image block.

The image capturing apparatus 100 according to the embodiment may encode the output image that is generated through the above-described processes (S65).

As such, according to the embodiments, the output image of improved image quality may be generated while satisfying the target bitrate.

One or more of the above embodiments may be embodied in the form of a computer program that may be run in and/or executed by a computer through various elements, and the computer program may be recorded on a non-transitory computer-readable recording medium. Examples of the non-transitory computer-readable recording medium include magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories). Furthermore, the computer program may be embodied on a formless medium that may be transmitted and distributed in a network, e.g., software or an application.

Meanwhile, the computer programs may be specially designed or well known to one of ordinary skill in the computer software field. Examples of the computer programs may include not only machine language code but also high-level language code which is executable by various computing means by using an interpreter.

The particular implementations shown and described herein are illustrative examples of the inventive concept and are not intended to otherwise limit the scope of the inventive concept in any way. For the sake of brevity, electronics, control systems, software, and other functional aspects of the systems according to the related art may not be described in detail. Furthermore, the connecting lines or connectors shown in the drawings are intended to represent example functional relationships and/or physical or logical couplings between the various elements. It should be noted that many alternative or additional functional relationships, physical connections, or logical connections may be present in a practical device. Moreover, no item or component is essential to the practice of the present disclosure unless the element is specifically described as "essential" or "critical".

Therefore, the spirit of the inventive concept shall not be limited to the above-described embodiments, and the entire scope of the appended claims and their equivalents will fall within the scope and spirit of the inventive concept.

According to the above embodiments, a method of adjusting bitrate of an image, capable of reducing transmission bitrate of an image by reducing degradation in an image quality, and an image capturing apparatus may be provided.

Also, according to the above embodiments, a method of adjusting bitrate of an image, allowing network resources to be efficiently used in a system including a plurality of image capturing apparatuses, and an image capturing apparatus may be provided.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the drawings, it will be understood by those of ordinary skill in the art that various changes in form and details may be made therein without departing from the spirit and scope of the inventive concept as defined by the following claims.

What is claimed is:

1. A method of adjusting a bitrate of an image frame, the method comprising:
    identifying magnitudes of one or more frequency components in the image by performing a two-dimensional (2D) discrete cosine transformation (DCT) on the image, and arranging the magnitudes of the one or more frequency components on a 2D plane in a first direction and a second direction of the image;
    determining a frequency filter based on a difference between a current bitrate and a target bitrate of the image, wherein the frequency filter reduces magnitudes of frequency components other than magnitudes of frequency components existing between an origin point and a predetermined boundary line on the 2D plane;
    wherein the predetermined boundary line is a straight line extending in a direction different from the first direction and the second direction, and the first direction and the second direction are perpendicular to each other;
    wherein the frequency filter consists of two constant values comprising:
        a first filter value corresponding to each of the frequency components existing between the origin point and the predetermined boundary line on the 2D plane; and
        a second filter value corresponding to each of the frequency components other than the frequency components existing between the origin point and the predetermined boundary line on the 2D plane;
    determining the number of low frequency components in the frequency filter having the first filter value, from the difference between the current bitrate and the target bitrate of the image, while values of the frequency filter remain unchanged, wherein as the difference between the current bitrate and the target bitrate increases, more number of high frequency components are excluded by the frequency filter and as the difference between the current bitrate and the target bitrate decreases, less number of high frequency components are excluded by the frequency filter;
    applying the determined frequency filter to the magnitudes of the one or more frequency components in real time;
    generating, in advance, the frequency filters corresponding to the difference between the current bitrate and the target bitrate;
    storing the frequency filters in advance in a memory;
    selecting in real time, the frequency filter stored in the memory, corresponding to real time difference between the current bitrate and the target bitrate, and applying the selected filter to the magnitude of the frequency component;
    wherein the image comprises a plurality of image blocks; and
    wherein the determining the frequency filter comprises determining a frequency filter corresponding to a difference between an output bitrate and a target bitrate of each image block, with respect to each of the at least one image block.

2. An image capturing apparatus comprising:
    at least a controller;
    a memory;

the controller being configured to identify magnitudes of one or more frequency components in an image input to the image capturing apparatus;

the controller performing a two-dimensional (2D) discrete cosine transformation (DCT) on the image, and arranging the magnitudes of the one or more frequency components on a 2D plane in a first direction and a second direction of the image;

the controller determining a frequency filter based on a difference between a current bitrate and a target bitrate of the image, wherein the frequency filter is configured to reduce magnitudes of frequency components other than magnitudes of frequency components existing between an origin point and a predetermined boundary line on the 2D plane;

wherein the predetermined boundary line is a straight line extending in a direction different from the first direction and the second direction, and the first direction and the second direction are perpendicular to each other;

wherein the frequency filter consists of two constant values comprising:
  a first filter value corresponding to each of the frequency components existing between the origin point and the predetermined boundary line on the 2D plane; and
  a second filter value corresponding to each of the frequency components other than the frequency components existing between the origin point and the predetermined boundary line on the 2D plane;

the controller determining the number of low frequency components in the frequency filter having the first filter value, from the difference between the current bitrate and the target bitrate of the image, such that greater the difference between the current bitrate and the target bitrate, magnitudes of more number of high frequency components are reduced by the frequency filter; and the controller applying the determined frequency filter to the magnitudes of the one or more frequency components in real time.

3. The image capturing apparatus of claim 2, wherein the controller is configured to multiply each of the magnitudes of the frequency components existing between the origin point and the predetermined boundary line on the 2D plane by the first filter value, and multiply each of the magnitudes of the frequency components other than the frequency components existing between the origin point and the predetermined boundary line on the 2D plane by the second filter value.

4. The image capturing apparatus of claim 2, wherein the predetermined boundary line is perpendicular to a line bisecting an angle formed by the first direction and the second direction.

5. The image capturing apparatus of claim 2, wherein the controller is configured to generate an output image based on the magnitudes of the one or more frequency components, to which the frequency filter is applied, and encode the output image.

6. The image capturing apparatus of claim 2, wherein the controller:
  generates, in advance, the frequency filters corresponding to the difference between the current bitrate and the target bitrate;
  stores the frequency filters in advance in the memory; and
  selects in real time, the frequency filter stored in the memory, corresponding to real time difference between the current bitrate and the target bitrate, and applies the selected filter to the magnitude of the frequency component.

7. A method of adjusting a bitrate of an image, the method comprising:
  identifying magnitudes of one or more frequency components in the image by performing a two-dimensional (2D) discrete cosine transformation (DCT) on the image, and arranging the magnitudes of the one or more frequency components on a 2D plane in a first direction and a second direction of the image;
  determining a frequency filter based on a difference between a current bitrate and a target bitrate of the image, wherein the frequency filter is configured to reduce magnitudes of frequency components other than magnitudes of frequency components existing between an origin point and a predetermined boundary line on the 2D plane;
  wherein the predetermined boundary line is a straight line extending in a direction different from the first direction and the second direction, and the first direction and the second direction are perpendicular to each other:
  wherein the frequency filter consists of two constant values comprising:
    a first filter value corresponding to each of the frequency components existing between the origin point and the predetermined boundary line on the 2D plane; and
    a second filter value corresponding to each of the frequency components other than the frequency components existing between the origin point and the predetermined boundary line on the 2D plane;
  determining the number of low frequency components in the frequency filter having the first filter value, from the difference between the current bitrate and the target bitrate of the image, while values of the frequency filter remain unchanged, wherein as the difference between the current bitrate and the target bitrate increases, more number of high frequency components are reduced by the frequency filter and as the difference between the current bitrate and the target bitrate decreases, less number of high frequency components are reduced by the frequency filter; and
  applying the determined frequency filter to the magnitudes of the one or more frequency components in real time.

8. The method of claim 7, wherein the applying the frequency filter to the magnitudes of the one or more frequency components comprises:
  multiplying each of the magnitudes of the frequency components existing between the origin point and the predetermined boundary line on the 2D plane by the first filter value; and
  multiplying each of the magnitudes of the frequency components other than the frequency components existing between the origin point and the predetermined boundary line on the 2D plane by the second filter value.

9. The method of claim 7, wherein the predetermined boundary line is perpendicular to a line bisecting an angle formed by the first direction and the second direction.

10. The method of claim 7, further comprising:
  after the applying the frequency filter, generating an output image based on the magnitudes of the one or more frequency components to which the frequency filter is applied; and
  encoding the output image.

11. The method of claim 7, further comprising:
generating, in advance, the frequency filters corresponding to the difference between the current bitrate and the target bitrate;
storing the frequency filters in advance in the memory; and
selecting in real time, the frequency filter stored in the memory, corresponding to real time difference between the current bitrate and the target bitrate, and applying the selected filter to the magnitude of the frequency component.

* * * * *